(12) United States Patent
Kim et al.

(10) Patent No.: US 8,939,079 B2
(45) Date of Patent: Jan. 27, 2015

(54) FIRST PRINTING PLATE AND SECOND PRINTING PLATE

(75) Inventors: Joo Yeon Kim, Daejeon (KR); Kyu-Ha Baek, Daejeon (KR); Lee Mi Do, Daejeon (KR); Ji Man Park, Daejeon (KR); Kunsik Park, Daejeon (KR); Zin Sig Kim, Daejeon (KR); Dong-Pyo Kim, Daejeon (KR); Ye Sul Jeong, Gyeongsangbuk-do (KR)

(73) Assignee: Intellectual Discovery Co., Ltd., Seoul (KR)

( * ) Notice: Subject to any disclaimer, the term of this patent is extended or adjusted under 35 U.S.C. 154(b) by 234 days.

(21) Appl. No.: 13/300,689

(22) Filed: Nov. 21, 2011

(65) Prior Publication Data

US 2012/0140350 A1    Jun. 7, 2012

(30) Foreign Application Priority Data

Dec. 6, 2010  (KR) .................. 10-2010-0123442

(51) Int. Cl.
*B41N 1/00* (2006.01)
*B29D 11/00* (2006.01)
*G02B 5/08* (2006.01)

(52) U.S. Cl.
CPC ............ *B41N 1/00* (2013.01); *B29D 11/00596* (2013.01); *G02B 5/0816* (2013.01)
USPC ........................................... 101/395

(58) Field of Classification Search
None
See application file for complete search history.

(56) References Cited

U.S. PATENT DOCUMENTS

| 7,687,007 B2 | 3/2010 | Ling et al. |
| 2003/0170429 A1 | 9/2003 | Engle et al. |
| 2005/0089671 A1 * | 4/2005 | Kubota .................... 428/143 |

FOREIGN PATENT DOCUMENTS

| JP | 2005-353576 A | 12/2005 |
| KR | 2010-0042424 A | 4/2010 |

OTHER PUBLICATIONS

Wen-Kuei Huang et al., "Organic Selective-Area Patterning Method for Microlens Array Fabrication", Microelectronic Engineering, vol. 83, pp. 1333-1335, Feb. 21, 2006.
Kwang-Ho Lee et al., "Solution Processable Micron—to Nanoscale Conducting Polymer Patterning Utilizing Selective Surface Energy Engineering", Organic Electronics, vol. 11, pp. 748-754, Jan. 21, 2010.

* cited by examiner

*Primary Examiner* — Joshua D Zimmerman
(74) *Attorney, Agent, or Firm* — Rabin & Berdo, P.C.

(57) ABSTRACT

Disclosed are a printing plate and a mirror thereof, the printing plate including: printing portions for transferring an immersed solution, the printing portions being formed flat and arranged at regular intervals on one side of an upper part of the printing plate; and non-printing portions corresponding to a remaining area other than the printing portions, the non-printing portions being formed with at least two concavities and convexities respectively and arranged at regular intervals on the other side of the upper part of the printing plate.

13 Claims, 3 Drawing Sheets

FIRST PRINTING PLATE AND SECOND PRINTING PLATE

CROSS-REFERENCE TO RELATED APPLICATIONS

This application is based on and claims priority from Korean Patent Application No. 10-2010-0123442, filed on Dec. 6, 2010, with the Korean Intellectual Property Office, the disclosure of which is incorporated herein in its entirety by reference.

BACKGROUND OF THE INVENTION

1. Field of the Invention

The present invention relates to a printing plate, and more particularly to a printing plate and a mirror thereof, which have different surface structures.

2. Description of the Prior Art

Conventionally, a photolithography process has been widely used in manufacturing electronic devices. However, the photolithography process increases an initial investment cost due to the use of expensive equipment, and decreases economic efficiency because an expensive mask is required in large quantities according to device integration.

Accordingly, various inexpensive printing methods for forming various patterns on a substrate based on high-resolution printing technology have recently been in the spotlight. Among them, a solution transfer printing method using gravure printing or micro-contact printing can efficiently form a thin film on a large-area substrate by transferring a solution onto the substrate, and thus has been actively studied and applied to practical use in recent years.

The solution transfer printing method using gravure printing or micro-contact printing uses the following two ways to obtain different surface energy:

The first way is to fabricate a printing plate, which itself is made of a material with low surface energy. The second way is to introduce another layer with low surface energy on the surface of a fabricated printing plate.

However, the first way has a problem in that there is a limitation on the material with low surface energy.

The second way has problems in that a chemical substance must be additionally used to apply an organic material with low surface energy all over the surface of a printing plate, it is difficult to maintain the surface energy of the organic material layer with an increase in the use frequency and with the passage of time, and the durability of a substrate must be taken into consideration. Further, the second way is disadvantageous in that the processing time is long because an additional surface treatment process is involved, and the overall processing time is also lengthened because additional time for preprocessing and post-processing is required for selective surface treatment (Ling et al., U.S. Pat. No. 7,687,007 B2 (2010)).

To solve these problems, in the study by K.-H. Lee et al. ("Solution processable micron- to nanoscale conducting polymer patterning utilizing selective surface energy engineering", Organic Electronics, article in press (2009)), a substrate was subjected to surface treatment by applying a photolithography process to a typical bottom-up printing technique such that the substrate selectively has low surface energy, and an organic material was used as the surface treatment material. However, together with a durability problem with the use of the organic material as a partition wall, there is a problem in that the overall processing time is lengthened due to the addition of the photolithography process.

In the study by W.-K. Huang et al. ("Organic selective area patterning method for microlens array fabrication", Microelectronic Engineering 83 (2006)), micro-contact printing was used for selective surface treatment, and a substrate was provided with different surface energy by dipping the entire mold in an organic material solution with low surface energy, taking out the mold from the organic material solution, and then transferring the organic material, which sticks to the mold portion to be contacted with the substrate, onto the substrate. In this case, however, the mold may be contaminated because the mold itself is dipped in the organic material solution with low surface energy, and the selective surface treatment on the substrate requires a process of transferring the organic material through micro-contact printing.

SUMMARY OF THE INVENTION

Accordingly, the present invention has been made to solve the above-mentioned problems occurring in the prior art, and an object of the present invention is to provide a printing plate and a mirror thereof, which have different surface energy, can simplify the process through a selective pattern using the different surface energy, and can be used semi-permanently.

In accordance with an aspect of the present invention, there is provided a printing plate including: printing portions for transferring an immersed solution, the printing portions being formed flat and arranged at regular intervals on one side of an upper part of the printing plate; and non-printing portions corresponding to a remaining area other than the printing portions, the non-printing portions being formed with at least two concavities and convexities respectively and arranged at regular intervals on the other side of the upper part of the printing plate.

In accordance with another aspect of the present invention, there is provided a mirror fabricated using a printing plate and having a symmetrical structure to the printing plate, the printing plate including: printing portions for transferring an immersed solution, the printing portions being formed flat and arranged at regular intervals on one side of an upper part of the printing plate; and non-printing portions corresponding to a remaining area other than the printing portions, the non-printing portions being formed with at least two concavities and convexities respectively and arranged at regular intervals on the other side of the upper part of the printing plate.

According to the present invention, by providing a printing plate with different surface structures, the printing plate has different surface energy, so that the printing plate can simplify the process through a selective pattern using the different surface energy.

Further, by providing a mirror using the printing plate without any additional separate process, the concavity and convexity characteristic of the printing plate can also be implemented in its entirety in the mirror, so that the processing time can be shortened through process simplification, and the printing plate can be used semi-permanently regardless of the use frequency and the use time.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
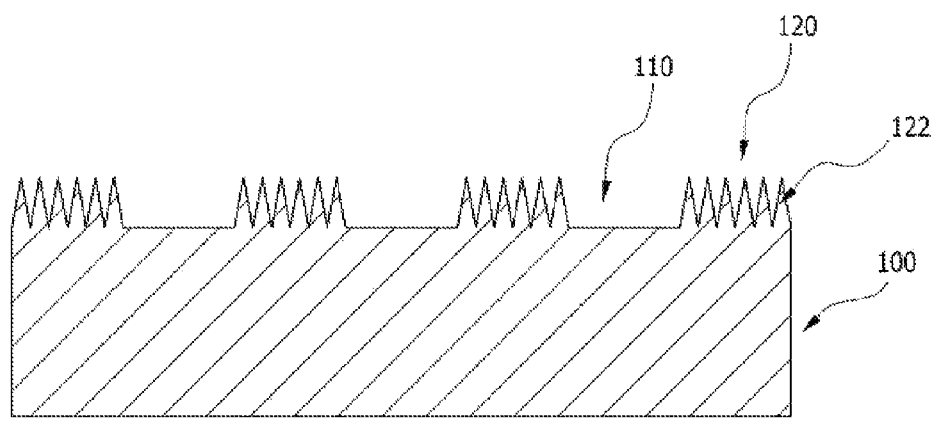
FIG. 1 is a sectional view of a printing plate according to an embodiment of the present invention.

Hereinafter, embodiments of the present invention will be described with reference to the accompanying drawings. The technical constructions and operational effects of the present invention will be more clearly understood from the following detailed description. In the following description and drawings, the same reference numerals are used to designate the same or similar components, and a detailed description of known functions and configurations incorporated herein will be omitted when it may make the subject matter of the present invention rather unclear.

Figure 2:
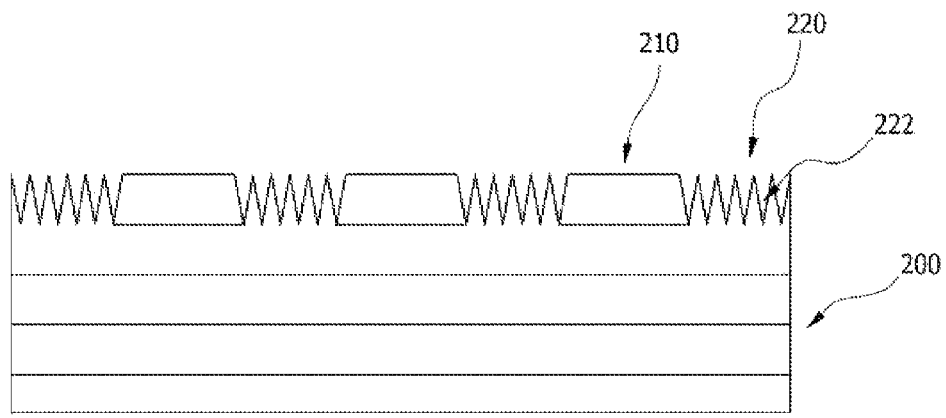
FIG. 2 is a sectional view of a mirror fabricated using the printing plate of FIG. 1.

FIG. 1 is a sectional view of a printing plate according to an embodiment of the present invention, and FIG. 2 is a sectional view of a mirror fabricated using the printing plate of FIG. 1.

Referring to FIG. 1, the printing plate (or mold) 100 according to this embodiment includes printing portions 110 for transferring an immersed solution (which may also be referred to as a "solution") and non-printing portions 120 corresponding to the remaining area other than the printing portions 110. The material of the printing plate 100 includes silicon (Si), glass, quartz, organic materials, inorganic materials, polymers, and the like. As used herein, "printing plate" may also be referred to as a "first printing plate."

The printing portions 110 are formed flat and arranged at regular intervals on one side of the upper part of the printing plate 100, and serve to transfer an immersed solution onto a substrate.

Figure 3:
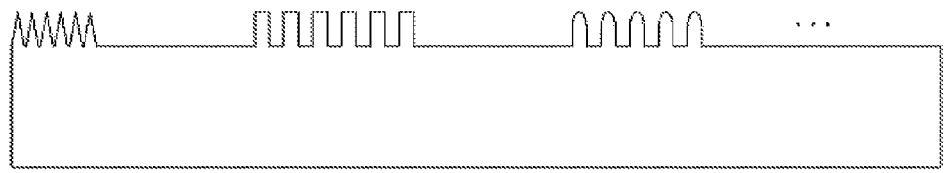
FIG. 3 is a view illustrating various types of concavities and convexities according to embodiments of the present invention.

The non-printing portions 120 corresponding to the remaining area other than the printing portions 110 are arranged at regular intervals on the other side of the upper part of the printing plate 100, and are formed with at least two concavities and convexities 122 respectively. Here, the concavities and convexities may be formed in a triangular shape, a quadrangular shape, a semicircular shape, and the like, as shown in FIG. 3.

These concavities and convexities 122 lead to a difference between the surface energy of the printing portions 110 and the surface energy of the non-printing portions 120, which allows the immersed solution to be automatically placed in the printing portions 110. Here, the surface energy of the non-printing portions 120 may be determined by the material of the printing plate 100, the size of the concavities and convexities 122, the shape of the concavities and convexities 122, the depth of the concavities and convexities, the spacing of the concavities and convexities 122, and the like.

The printing plate 100 according to the present invention may be used to manufacture electronic devices by using gravure printing, screen printing, micro-contact printing and the like involving a solution process.

In an embodiment of the present invention, as shown in FIG. 2, a mirror 200 with a symmetrical structure to the printing plate 100 of FIG. 1 can also be fabricated by applying a contact printing or imprinting technique to the printing plate 100 without any additional separate process. That is, in the same manner as the printing plate 100, the mirror 200 includes printing portions 210 for transferring an immersed solution, which are formed flat and arranged at regular intervals on one side of the upper part of the mirror 200, and non-printing portions 220 corresponding to the remaining area other than the printing portions 210, which are formed with at least two concavities and convexities 222 and arranged at regular intervals on the other side of the upper part of the mirror 200. As used herein, "mirror" may also be referred to as a "second printing plate."

Accordingly, in the embodiment of the present invention, it is possible to shorten the processing time through process simplification because the mirror 200 can be fabricated using the printing plate 100 without any additional separate process. Further, since the mirror 200 can be used in the actual solution process in place of the printing plate 100, the printing plate 100 can be used semi-permanently regardless of the use frequency and the use time.

Figure 4:
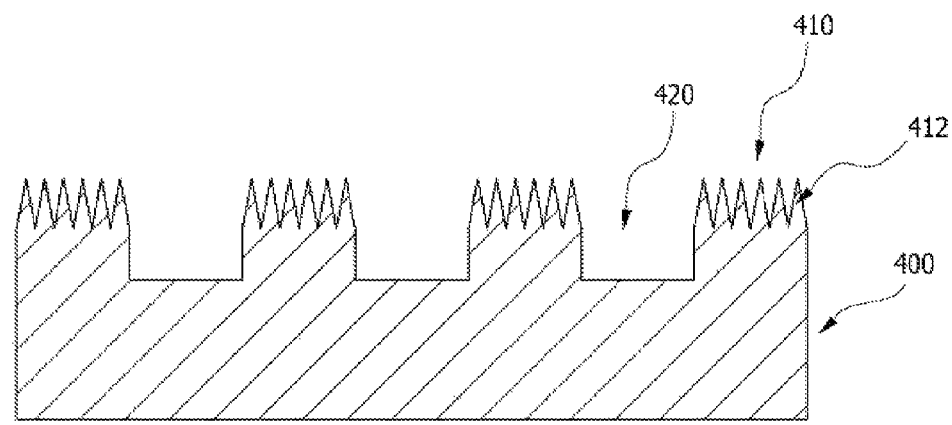
FIG. 4 is a sectional view of a printing plate with an embossment and an intaglio according to an embodiment of the present invention.
Figure 5:
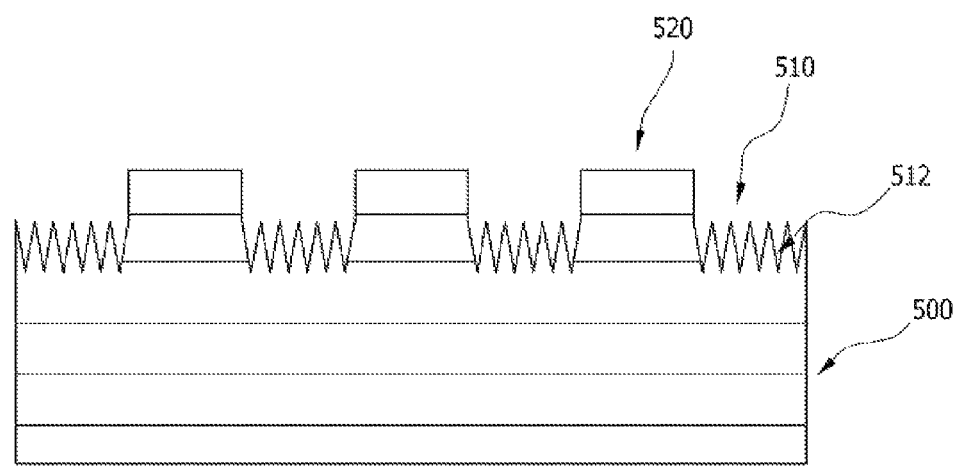
FIG. 5 is a sectional view of a mirror fabricated using the printing plate of FIG. 4.

FIG. 4 is a sectional view of a printing plate with an embossment and an intaglio according to an embodiment of the present invention, and FIG. 5 is a sectional view of a mirror fabricated using the printing plate of FIG. 4.

Referring to FIG. 4, the printing plate 400 according to this embodiment has a step height provided by the embossment 410 and the intaglio 420, the embossment portion 410 is formed with at least two concavities and convexities 412, and the intaglio portion 420 is formed flat. Accordingly, the embossment 410 and the intaglio 420 have different surface energy.

Also, as shown in FIG. 5, a mirror 500 with a symmetrical structure to the printing plate 400 of FIG. 4 can be fabricated using the printing plate 400. That is, the intaglio portion 510 of the mirror 500 (i.e., the inner portion of the container) is formed with concavities and convexities 512, and the embossment portion 520 of the mirror 500 is formed flat.

Therefore, in the embodiment of the present invention, a solution can be selectively transferred by the step height, provided by the embossment and intaglio, and the concavities and convexities, and this structure can be used in micro-contact printing or gravure printing. With regard to this, the printing plate 400 of FIG. 4 may be subjected to chemical surface treatment for effective solution transfer.

Figure 6:
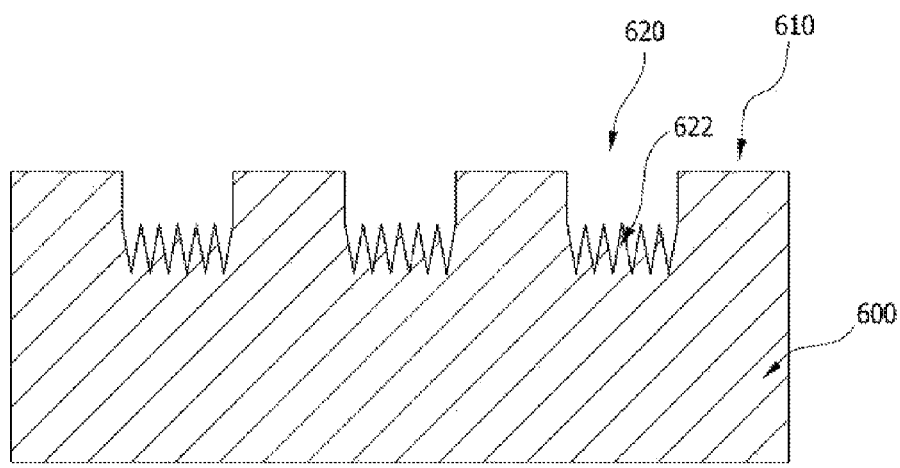
FIG. 6 is a sectional view of a printing plate with an embossment and an intaglio according to another embodiment of the present invention.
Figure 7:
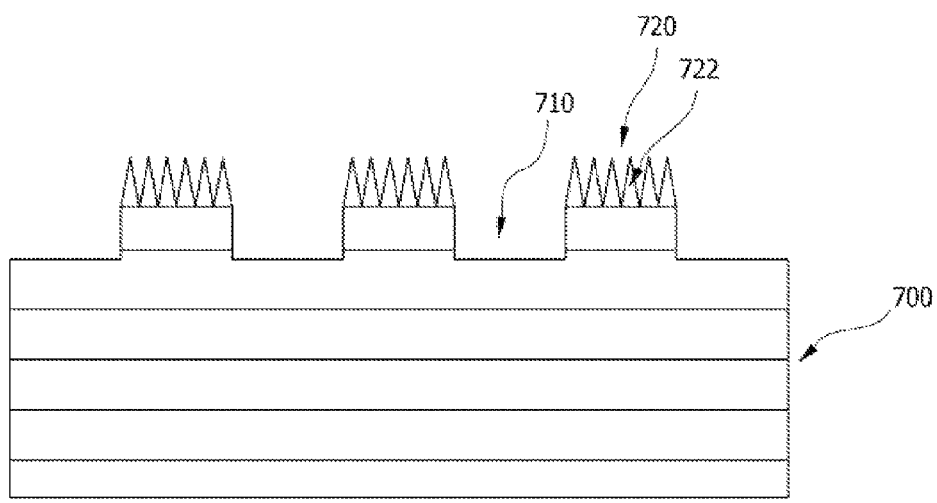
FIG. 7 is a sectional view of a mirror fabricated using the printing plate of FIG. 6.

FIG. 6 is a sectional view of a printing plate with an embossment and an intaglio according to another embodiment of the present invention, and FIG. 7 is a sectional view of a mirror fabricated using the printing plate of FIG. 6.

Referring to FIG. 6, the printing plate 600 according to this embodiment has a step height provided by the embossment 610 and the intaglio 620. However, dissimilar to FIG. 4, the embossment portion 610 is formed flat, and the intaglio portion 620, that is, the inner portion of the container, is formed with at least two concavities and convexities 622.

Also, as shown in FIG. 7, a mirror 700 with a symmetrical structure to the printing plate 600 of FIG. 6 can be fabricated using the printing plate 600. That is, the intaglio portion 710 of the mirror 700 (i.e., the inner portion of the container) is formed flat, and the embossment portion 720 of the mirror 700 is formed with concavities and convexities 722.

Conventionally, a substrate is locally subjected to surface treatment through photolithography or micro-contact printing in order to provide a surface energy difference for selective solution transfer. However, in the case of the mirror 700, the concavities and convexities 722 are introduced in a portion that comes into contact with a to-be-transferred-substrate during the solution transfer process, and depending on the degree of surface energy exhibited by this portion, confining or spreading of the solution can be implemented by the surface energy difference of the mirror 700 itself without any preprocessing for the substrate when the solution contained in the intaglio portion 710 is transferred onto the substrate.

Using this effect, a local pattern (e.g., dot, bit, or pixel) or a connected pattern (e.g., line or face) can be formed without any additional separate process, which results in process simplification.

Although specific embodiments of the present invention have been described for illustrative purposes, the present invention is not limited those embodiments, and various modifications, additions and substitutions are possible without departing from the scope and spirit of the invention as disclosed in the accompanying claims.

What is claimed is:

1. A printing plate comprising:
   printing portions for transferring a solution, the printing portions each being formed smoothly so as to not include any bumps, the printing portions being arranged at regular intervals on an upper part of the printing plate; and
   non-printing portions corresponding to a remaining area of the printing plate other than an area where the printing portions are disposed, the non-printing portions each being formed with a plurality of concavities and a plurality of convexities, the non-printing portions being arranged at regular intervals on the upper part,
   a distance between adjacent ones of the convexities of the non-printing portions being smaller than a total length of one of the printing portions.

2. The printing plate as claimed in claim 1, wherein the concavities and the convexities of the non-printing portions are formed in any one of a triangular shape, a quadrangular shape, and a semicircular shape.

3. The printing plate as claimed in claim 1, wherein a surface energy of the concavities and the convexities of the non-printing portions is determined by any one of
   the sizes of the concavities and the convexities of the non-printing portions,
   the shapes of the concavities and the convexities of the non-printing portions,
   the depths of the concavities and the convexities of the non-printing portions, and
   the spacings of the concavities and the convexities of the non-printing portions.

4. The printing plate as claimed in claim 3, wherein a material of the printing plate includes at least one of silicon, glass, quartz, organic materials, inorganic materials, and polymers.

5. The printing plate as claimed in claim 1, further comprising an embossment and an intaglio forming a step height therebetween.

6. The printing plate as claimed in claim 5, wherein the non-printing portions are formed in the embossment, and the printing portions are formed in the intaglio.

7. The printing plate as claimed in claim 5, wherein the printing portions are formed in the embossment, and the non-printing portions are formed in the intaglio.

8. The printing plate as claimed in claim 1, wherein the printing plate is used in any one of a gravure printing apparatus, a screen printing apparatus, and a micro-contact printing apparatus.

9. The printing plate as claimed in claim 1, wherein the printing portions are arranged at the regular intervals on one side of the upper part, and the non-printing portions are arranged at the regular intervals on another side of the upper part.

10. The printing plate as claimed in claim 1, wherein a surface of the printing plate is furthest away from each of the non-printing portions and the printing portions, the printing portions each being a distance from the surface, that is a smallest distance therebetween, that is equal to or greater than a distance from the surface to the non-printing portions.

11. The printing plate as claimed in claim 1, wherein along a straight line, each of the printing portions is disposed between two of the non-printing portions.

12. A printing plate comprising:
    printing portions for transferring a solution, the printing portions being formed smoothly so as to not include any bumps, the printing portions being arranged at regular intervals on an upper part of the printing plate; and
    non-printing portions corresponding to a remaining area of the printing plate other than an area where the printing portions are disposed, the non-printing portions each being formed with a plurality of concavities and a plurality of convexities, the non-printing portions being arranged at regular intervals on the upper part,
    a surface of the printing plate being furthest away from each of the non-printing portions and the printing portions, the printing portions each being a distance from the surface, that is a smallest distance therebetween, that is equal to or greater than a distance from the surface to the non-printing portions.

13. The printing plate according to claim 12, wherein a distance between adjacent ones of the convexities of the non-printing portions being smaller than a total length of one of the printing portions.

* * * * *